United States Patent Office 3,202,178
Patented Aug. 24, 1965

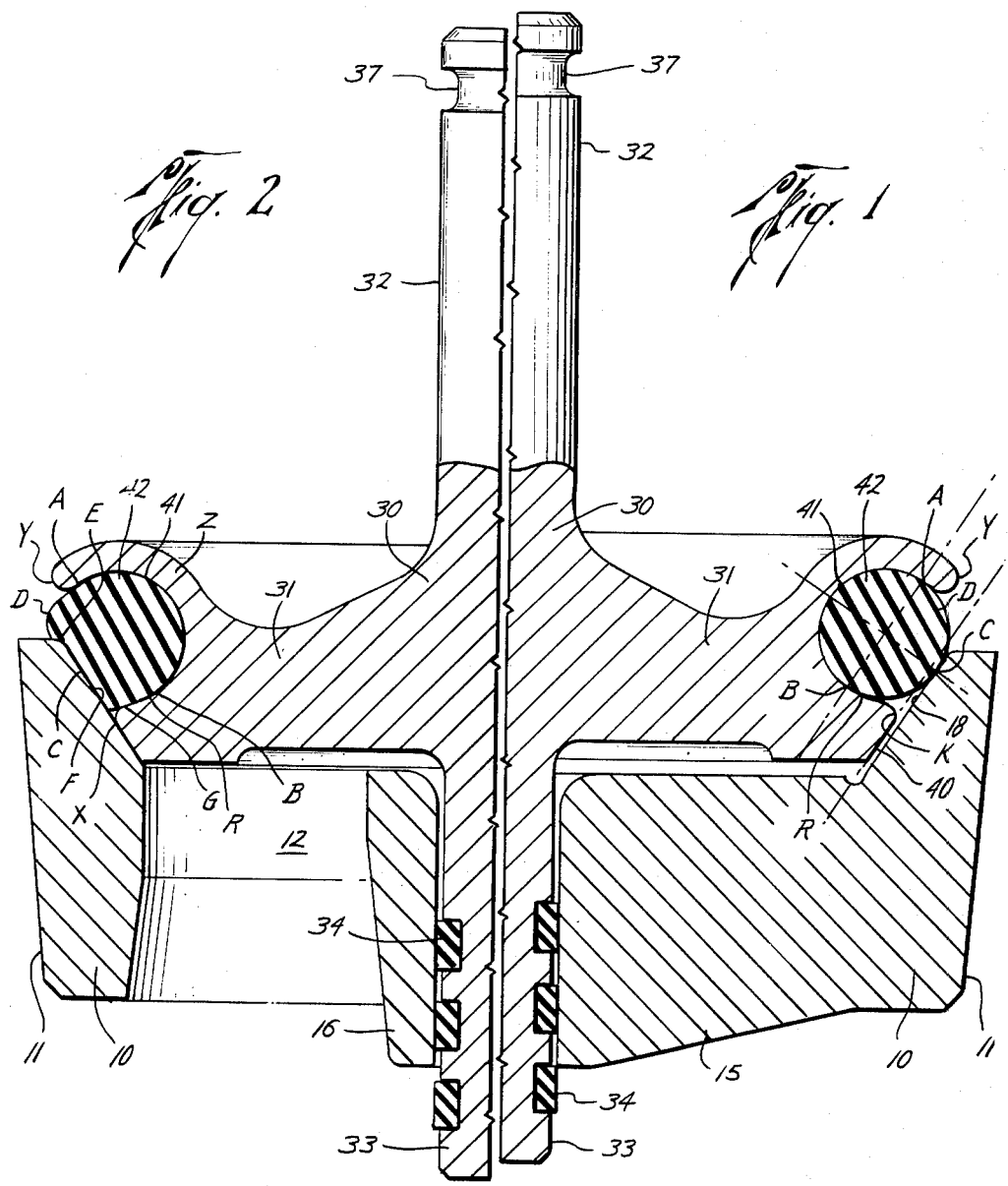
Duane Milton Wolfe
INVENTOR.

3,202,178
VALVES
Duane Milton Wolfe, Oklahoma City, Okla., assignor to AMF American Iron, Inc., Oklahoma City, Okla., a corporation of Delaware
Filed Oct. 20, 1964, Ser. No. 405,301
2 Claims. (Cl. 137—516.29)

This is a continuation-in-part of application Serial No. 196,412 filed May 21, 1962.

This invention pertains to valves and more particularly to valves for slush pumps such as are used in oil well drilling.

According to usual practice the pump body is provided at each of its inlet and outlet ports with a metal valve seat ring forming a conically tapered seat with a flow passage axially therethrough. The valve closure cooperating with the seat ring includes a metal circular disc having at its outer periphery a conically tapered seating portion correlative to said conically tapered seat and adapted to engage and seal therewith. A guide stem on the valve disc reciprocates in a guide bearing in the seat ring to constrain the motion of the valve disc to axial translation concentric with the seat ring and allows rotation of the valve disc relative to the valve seat with respect to the seat axis.

Further in accordance with the usual practice, the valve closure includes in addition to the metal disc an elestomer seal. In the usual case the elastomeric seal has been provided by a layer of elastomer material, the central portion of which is sandwiched between the upper and lower portions of a two piece disc, one or both of which portions provide a peripheral metal seating portion to engage the seat ring. The outer periphery of the elastomer ring extends beyond the disc and is exposed to fluid pressure on its upper surface so as to press the elatomer ring against its seat.

For ease of manufacture and reduced susceptibility to damage in use, it is desirable to use a one piece valve disc. To eliminate the need for a multipart valve disc it has heretofore been proposed to use for the elastomer seal a ring of small area in cross sections taken in planes in which lies the axis of revolution of the ring (hereinafter called simply the cross section) so that it may be stretched and snapped into place in a groove in a one piece valve disc. A problem to be faced with such snap on elastomer seal rings is that they tend to become separated from the metal valve disc. To provide retention for such seal rings various angular or irregular cross-section shapes have been used for the elastomer ring and the groove in the disc in an effort to obtain interlock, and attempts have been made to key the elastomer ring to the metal disc.

It would be desirable to use an O-ring as the elastomer seal ring in order to obtain the special sealing and long lasting qualities normally associated with an O-ring seal. Such qualities however stem at least in part from the uniform stress distribution in the O-ring, due to its perfectly symmetrical cross-section. In any event such cross-section obviously provides a minimum of the previously discussed retention quality for a slush pump valve snap on seal ring. The problem of providing retention if an O-ring is used is further compounded by the fact that the O-ring must distort in order to perform its sealing function.

It is an object of the present invention to overcome the aforementioned difficulties encountered with a one piece valve disc and snap on seal rings and to provide a slush pump valve including a one piece valve disc with an O-ring seal.

According to the invention the valve disc is a unitary member at least insofar as the seal ring supporting portion thereof is concerned. The outer periphery of the valve disc adjacent its upper, i.e., downstream side is provided with an annular radially outwardly opening groove within which is disposed a seal ring. The seal ring is an elastomer O-ring. The groove includes a support portion of semicircular cross section in full contact with the O-ring. The cone defined by the diameters of the semi-circular cross sections of the support portion of the groove has the same taper angle as the cone of the metal seating surface of the valve disc. This provides balanced support for the O-ring, thereby minimizing and overcoming the rentention problem. The O-ring extends outwardly beyond the cone of the seating surface of the valve disc so that when the valve closure comprising the disc and O-ring moves toward closed position it is the O-ring that first contacts the valve seat, cushioning the valve disc and providing a rapid shutoff. Mechanical pressure of the valve disc on the O-ring, due to fluid pressures on the disc and also fluid pressure acting directly on the O-ring, distorts the O-ring, flattening it against the valve seat. The distortion and flattening of the O-ring provides area contact for sealing with the valve seat and flows the elastomer into the pores of the valve seat for tight sealing. The flattening continues until the metal seating portion of the valve disc fully engages the valve seat and also seals therewith, backing up the O-ring seal. Due to the perfectly rounded shape of the O-ring, the distortion causes no severe stress concentrations in the O-ring. The mouth of the O-ring receiving groove of the valve disc is shaped to provide adequate room for the flow of the elastomer of the O-ring during closing so that the O-ring is not forced into the juncture between the valve disc and seat and pinched. The upper part of the valve disc extends radially as far as the O-ring for further support.

For a detailed description of a preferred embodiment of the invention reference will now be made to the accompanying drawings, wherein FIGURE 1 is an axial section, partly in elevation, showing the right half of a valve embodying the invention, the parts being illustrated in the position existing when the O-ring is just in contact with the seat, FIGURE 2 is a view similar to FIGURE 1 showing the left half of the valve and illustrating the position of the parts when the valve is fully closed.

Seat

Referring now to FIGURES 1 and 2, there is shown a metal, e.g. steel, valve seat ring 10 having a tapered outer periphery 11 adapted to be received in the valve deck of a slush pump. The inner periphery 12 of the seat ring is generally cylindrical and defines a flow passage through the ring. One or more radial webs 15 extend inwardly from the inner periphery of the ring to support a guide bearing 16. The upper inner edge of the seat ring is formed with an upwardly flaring conically tapered seat 18.

The taper angle of the seat 18 is preferably between 20 and 50 degrees, e.g., 35 degrees. This is large enough to insure that the closure does not stick to the seat, especially in the case of a dry seat, and at the same time insures adequate wedging pressure on the O-ring to cause it to seal and the valve disc to seat under normal fluid loads.

Closure

A valve closure 30 includes a metal, e.g. steel, one piece disc 31 having an upper guide stem 32 and a lower guide stem 33 formed integrally therewith.

Lower stem

The lower guide stem is provided with a plurality of elastomer wear rings 34 disposed in annular grooves around the stem. These wear rings protrude slightly beyond the outer surface of the stem and engage the inner surface of guide bearing 16 within which the guide stem may reciprocate and is free to turn.

Upper stem

The upper guide stem is adapted to reciprocate in a guide bearing in the valve pot cover (not shown). A helical spring (not shown) to bias the valve closure to closed position may be disposed concentric with the upper end of stem 32 and connected therewith by a clamp (not shown) engaging annular groove 37.

Disc

The outer periphery of the valve disc is provided at its lower edge with a conically tapered upwardly flaring seating surface 40, correlative to valve seat 18 and adapted to engage and seal therewith as shown in FIGURE 2. Above the seating surface 40 the disc is provided with an annular groove 41.

O-ring

Within groove 41 is disposed an elastomer O-ring 42. As is apparent from FIGURE 1, the O-ring protrudes outwardly beyond the cone of seating surface 40, the part of maximum extent perpendicular to the cone elements being designated by the reference letter C, the thickness of the protruding portion being of the order of 5 to 10 percent of the diameter of the circular cross section of the ring. The ring may be a compound of natural or synthetic rubber or other elastomer. A durometer hardness of from 50 Shore A scale to 70 Shore D scale, e.g. 60 Shore D scale or about 95 to 100 Shore A scale, would be suitable to allow sufficient but not excessive flow of the elastomer under usual slush pump valve pressures. Since the Shore A scale, corresponding to ASTM designation D676–57T has a maximum of 100, it may be said with reference thereto that a durometer hardness in excess of 50 is suitable.*

The ring is assembled with the disc by stretching the O-ring until it is large enough to pass over the lower portion of the valve disc and then allowing the O-ring to contract ("snap") into the groove, wherein it is retained by hoop tension in the O-ring.

The O-ring is a torus, preferably of circular cross section, although an elliptical cross section ring would also be suitable.

O-ring groove

Groove 41 opens radially outwardly to the side of the disc. The groove includes a portion extending from A at the upper side of the groove to B at the lower side of the groove that is semi-circular in cross section. This portion of the groove provides a support surface for the O-ring that makes full area contact therewith.

The diameter AB is parallel to the cone elements of the valve seat and seating surface of the valve disc coplanar therewith. In other words, the cone defined by the diameters AB of the cross sections of the groove taken all around same is coaxial with and has the same apex angle as the cones of the valve seat and the seating surface of the valve disc. The support surface of the groove 41 is thus a segment of a torus cut off by the cone defined by diameters AB; specifically, the support surface is a hemi-torus.

The portion of the groove 41 outwardly of the support surface cone defined by diameter AB forms the mouth of the groove. At the lower side of the mouth of the groove, the circular cross section of the groove may continue 5 to 15 degrees, e.g., 10 degrees from B to R to provide a slight mechanical interlock to assist in retaining the O-ring in the groove. Beyond R the side of the groove continues tangentially to the circular cross section portion of the groove, hence making an obtuse angle with the portion of the valve seat thereabove and an acute angle with the seating portion 40 of the valve disc, its juncture therewith being rounded at K.

The upper side of the groove flares away from the circular cross section of the support surface portion of the groove, joining the upper part of the valve disc in a rounded edge providing a lip Y. The mouth of the groove from YK to AB is large enough to receive the O-ring during assembly without having to greatly distort the O-ring in cross section.

Closing-mechanical support

Port C of the O-ring is the first part of the valve closure to contact the seat 18 when the valve closes, thereby cushioning the closing of the valve.

Although the O-ring initially makes sliding contact with the seat 18, since the seat will usually be wet at the time of closure of the valve there will be little frictional resistance between the O-ring and seat. Therefore most of the force on the O-ring due to contact with the seat will be directed perpendicularly to the seat. Since, as has been noted previously, the chord or diameter AB is substantially parallel to the valve seat 18, the area of contact of the groove with the O-ring provides a balanced support without any tendency for the O-ring to be rolled out of the groove.

Although there is little likelihood of the O-ring actually being forced completely out of its groove it is desirable that it not be disturbed therein at all. Any separation of the O-ring from its supporting groove allows the entrance of the fluid controlled by the valve, and particularly in the case of drilling mud such fluid may contain abrasives which can settle out between the O-ring and its supporting groove. Any small particles thus lodged under the O-ring will cause stress concentration and rapid deterioration of the O-ring. Therefore the balanced supporting arrangement of the present construction which reduces the likelihood of particles being trapped behind the O-ring, is of great value.

Closing-displacement space

As described above, it is desirable to protect the O-ring by supporting it against displacement during closure. It is equally important to protect it at this time against pinching. This is done by allowing room for distortion during closing. The portion EF, FIGURE 2 is the portion of the O-ring that is flattened in cross section to conform to the cone of the valve seat when the valve is closed. The volume of the O-ring torus cut off by the valve seat cone must flow. For balance, half of this volume should flow up and half down. Therefore the volume FRX, of FIGURE 2 should be as large or larger than half of the aforementioned cut off volume ECF in order to avoid flow of the elastomer O-ring into the crack between valve disc seating surface 40 and the valve seat. There should be at least as large a space for expansion for the portion D of the O-ring.

Otherwise expressed, the total volume between the valve seat and the lower or upper side of the mouth of the O-ring groove and the cone defined by the diameters AB and a cone coaxial therewith through the mid points of the diameters AB perpendicular to diameters AB (whose apex angle is the supplement of the seating surface cone apex angle) is at least equal to one half the volume between the support surface and support surface cone i.e. at least equal to one quarter the volume of the O-ring.

Opening-displacement space

When the valve starts to open, the closure 30 lifts under the pressure of the fluid in the pump cylinder or fluid inlet line. Initially it is the seating surface 40 of disc 31 that leaves valve seat 18, the O-ring 42 remaining in contact with seat 18. In this condition the fluid pressure (in the

---

* Copy of ASTM designation D676–59T and of a Shore durometer conversions table and of a Shore brochure entitled "Two Durometers Covering the Full Range of Elastomers" accompanying this specification.

pump cylinder in the case of an outlet valve, or in the pump inlet line in the case of an inlet valve) acts against the portion of the O-ring in the area GF and tends to flatten out the bulge toward X that previously existed. The elastomer of the O-ring is thus forced to flow more into the volume at D causing this portion to enlarge still farther, the whole O-ring being at the hydrostatic pressure of the fluid in the pump or pump inlet line. Because the O-ring is unconfined at D, it is free to expand at this portion without being forced into any crack which might unduly strain the elastomer and cause failure.

*Opening-mechanical support*

Finally, an opening of the valve, the O-ring leaves seat 18 and the fluid flows between the O-ring and the seat 18. The maximum diameter portion Y of the valve disc, overlying the O-ring, extends radially horizontally as far as the O-ring so that the vertical components of the fluid dynamic forces then exerted against the O-ring are well supported by the disc 31. Horizontal components of the fluid pressure, static and dynamic, are either supported by the central core of the valve disc 31 or opposed by hoop tension in the O-ring. Therefore with the large amount of support against vertical forces provided by the overhanging portion YZ of the valve disc, there is little tendency for the O-ring to separate from the valve disc during the final opening of the valve and its continued existence in the open position.

*Sealing*

It is to be noted that although the portion YZ of the disc overhangs the O-ring to provide support as described in the preceding section, preferably the portion Y does not engage the valve seat, for this would block off hydrostatic pressure above the O-ring. By allowing such pressure to enter at the side of the O-ring the self sealing action of exposure of the seal to fluid pressure is obtained, thereby enhancing the sealing effect. The O-ring is also pressed against the seat mechanically by the valve disc, however, so that the action is not merely that of a simple lip seal. A combined hydrostatic and mechanical sealing action is obtained, albeit that the mechanical pressure of the disc is itself due to fluid pressure on the disc.

*Conclusion*

Summarizing, by virtue of the particular configuration of the valve disc and the groove therein relative to the O-ring and the seat engaging surface of the valve disc and the valve seat, it is poossible successfully to incorporate an O-ring seal in a slush pump valve, thereby obtaining the advantages of O-ring type sealing and making more practical the use of a one piece valve disc.

The valve includes a metal to metal seal to back up the O-ring, the O-ring serves as a cushion for the metal to metal seal, and the O-ring is sufficiently exposed to the fluid being sealed to add a hydrostatic pressure to the mechanical pressure of the valve disc on the O-ring to enhance sealing thereof; yet there is no abrasive fluid trapped between the elastomer O-ring and the valve disc or seat during operation of the valve, and there is no part of the O-ring that is pinched between the metal valve disc and valve seat at any time.

While a preferred embodiment of the invention has been shown and described, modifications thereof can be made by one skilled in the art without departing from the spirit of the invention and it is intended to protect by Letters Patent all forms of the invention falling within the scope of the following claims:

What is claimed is:

1. A slush pump valve comprising
    a metal valve seat ring having an upper end and a lower end,
        said seat ring having an upwardly inwardly facing conically tapered inner peripheral surface providing a valve seat,
    a metal valve disc mounted for reciprocation in the line of the seat axis,
        said valve disc having a downwardly outwardly facing outer peripheral seating surface conically tapered correlative to said valve seat adapted to engage the lower part of the valve seat when the disc is in the lowermost position of its range of reciprocation,
        said valve disc also having a downwardly outwardly facing outer peripheral annular groove above said seating surface,
            at least the portion of said disc having said groove being unitary,
    an elastomer O-ring having durometer hardness in excess of 50 snapped into said groove,
        said groove having a portion whose cross sections are semicircular providing a support surface,
        said O-ring being in full contact engagement with said support surface,
        the cone defined by the diameters of said semicircular cross sections being coaxial with and having the same size apex angle as the cone of said conically tapered seating surface of the valve disc,
        the apex of said cone of said support surface being above the apex of said cone of said seating surface,
        the cones of said seat, sealing surface and support surface having a taper angle between 20 and 50 degrees,
        the perpendicular distance between said support surface cone being less than the radius of said semicircular cross section whereby said O-ring protrudes from said groove beyond the cone of said seatitng surface of the valve disc to engage said valve seat prior to the engagement thereof by said seating surface of the valve disc upon closure of the valve,
        the thickness of the portion of said O-ring protruding beyond said seating surface cone of the valve disc being of the order of 5 to 10% of the diameter of the O-ring cross section,
        said groove having a mouth formed by the portions of the groove lying outwardly downwardly from said support surface cone,
        the minimum distance between the sides of said mouth of the groove being of at least about the same extent as the diameter of said semicircular cross sections to admit the O-ring,
        the volume defined when said valve seat seating surface is in engagement with said valve seat by the lower side of said groove mouth and said valve seat and said support surface cone and a cone through the mid points of the diameters of said semicircular cross sections whose apex lies on the axis of the valve disc seating surface and whose apex angle is oppositely facing to and is the supplement of the apex angle of the seating surface cone apex angle being at least as large as one half the volume defined by said support surface and said support surface cone to accommodate the elastomer of the O-ring as it flows on closure of the valve,
        the space between said support surface cone and said cone through the mid points and said valve seat and the upper side of said groove mouth when said valve is in closed position being at least as large as said one half the volume defined by said support surface and said support surface cone to accommodate the elastomer of the O-ring as it flows on closure of the valve,
            the lower side of said mouth portion forming with the valve seat surface thereabove an obtuse angle.

2. A valve closure comprising a metal valve disc having an upper end and a lower end,
  said disc having a downwardly outwardly facing outer peripheral conically tapered seating surface,
  said disc also having a downwardly outwardly facing outer peripheral annular groove above said seating surface,
  at least the portion of said disc having said groove being unitary,
  an elastomeric toroidal seal ring of substantially circular cross section and of durometer hardness in excess of 50 disposed in said groove,
  said groove having a portion that is an annular segment of a torus providing a support surface,
    said seal ring being in full surface contact with said support surface,
    said segment being defined by a toroidal surface coaxial with said seating surface and a cone coaxial with said seating surface and of equal apex angle therewith,
      the apex of the cone defining the support surface segment being above the apex of the cone of the seating surface,
      the taper angle of said seating surface and support surface cone being in the range of 20 to 50 degrees,
  a portion of said seal ring protruding from said groove outwardly beyond said seating surface cone,
  said protruding portion having a thickness of from 5 to 10 percent of the diameter of said circular cross section thereof,
  said groove having a mouth portion formed by portions of the groove lying outwardly downwardly from said support surface cone,
  there being an annular space between said seal ring and the lower side of the mouth of said groove at least equal in volume to one half the volume of said protruding portion of the seal ring,
  the outer periphery of said seal ring above said protruding portion and beneath the upper side of said mouth of the groove being unconfined,
  the lower side of the mouth portion of said groove forming and acute angle with said seating surface therebelow.

No references cited.

M. CARY NELSON, *Primary Examiner.*